United States Patent [19]

Rastas et al.

[11] 4,366,127
[45] Dec. 28, 1982

[54] HYDROMETALLURGICAL PROCESS FOR THE RECOVERY OF LEAD, SILVER AND GOLD, AS WELL AS ZINC, FROM IMPURE JAROSITE RESIDUES OF AN ELECTROLYTIC ZINC PROCESS

[75] Inventors: Jussi K. Rastas; Jens R. Nyberg, both of Pori, Finland

[73] Assignee: Outokumpu Oy, Helsinki, Finland

[21] Appl. No.: 306,673

[22] Filed: Sep. 29, 1981

[30] Foreign Application Priority Data

Sep. 30, 1980 [FI] Finland ................................. 803099

[51] Int. Cl.³ .............................................. C22B 3/00
[52] U.S. Cl. ...................................... 423/26; 423/95; 423/109; 423/146; 75/2; 209/166; 209/167
[58] Field of Search ............... 423/26, 109, 146; 75/2; 209/166, 167

[56] References Cited

U.S. PATENT DOCUMENTS

| | | | |
|---|---|---|---|
| 2,074,699 | 3/1937 | Lenher | 252/61 |
| 3,652,264 | 3/1972 | Bodson | 75/120 |
| 3,968,032 | 7/1976 | Menendey | 209/166 |
| 3,976,743 | 8/1976 | Landucci | 423/109 |

FOREIGN PATENT DOCUMENTS

| | | | |
|---|---|---|---|
| 2620654 | 12/1976 | Fed. Rep. of Germany | 423/109 |
| 2708059 | 9/1977 | Fed. Rep. of Germany | 423/109 |
| 49-10881 | 3/1974 | Japan | 423/26 |

*Primary Examiner*—Brian E. Hearn
*Attorney, Agent, or Firm*—Brooks, Haidt, Haffner & Delahunty

[57] ABSTRACT

The impure jarosite residue of an electrolytic zinc process is leached in a sulfuric-acid-bearing solution in order to produce a leach residue which contains lead, silver and gold and a ferrisulfate-bearing solution and to separate them from each other, whereafter the leach residue is sulfidized and froth-flotated in order to recover a combined concentrate which contains lead, silver and gold, and the ferrisulfate-bearing solution is fed to a ferritic treatment stage, in which ferrisulfate and ferrites react in the presence of ions of alkali and ammonium at 80°–105° C. and form pure jarosite and zinc sulfate.

10 Claims, 3 Drawing Figures

LEGEND:

RA   RETURN ACID
C    CALCINE
NL   NEUTRAL LEACH
RS   RAW SOLUTION
J    JAROSITE PRECIPITATE
RES  RETURN SOLUTION
JL   LEACH OF OLD JAROSITE PRECIPITATE
LJ   LEACH RESIDUE FROM LEACH STAGE OF JAROSITE

SE   SEPARATION OF SOLID AND SOLUTION
S    SULFIDIZATION STAGE
F    FROTH-FLOTATION STAGE
CS   CONVERSION STAGE
SA   SULFURIC ACID, $NH_3$, $(NH_4)_2SO_4$ OR $Na_2SO_4$

▰▰▰ SOLID PHASE
─── LIQUID PHASE

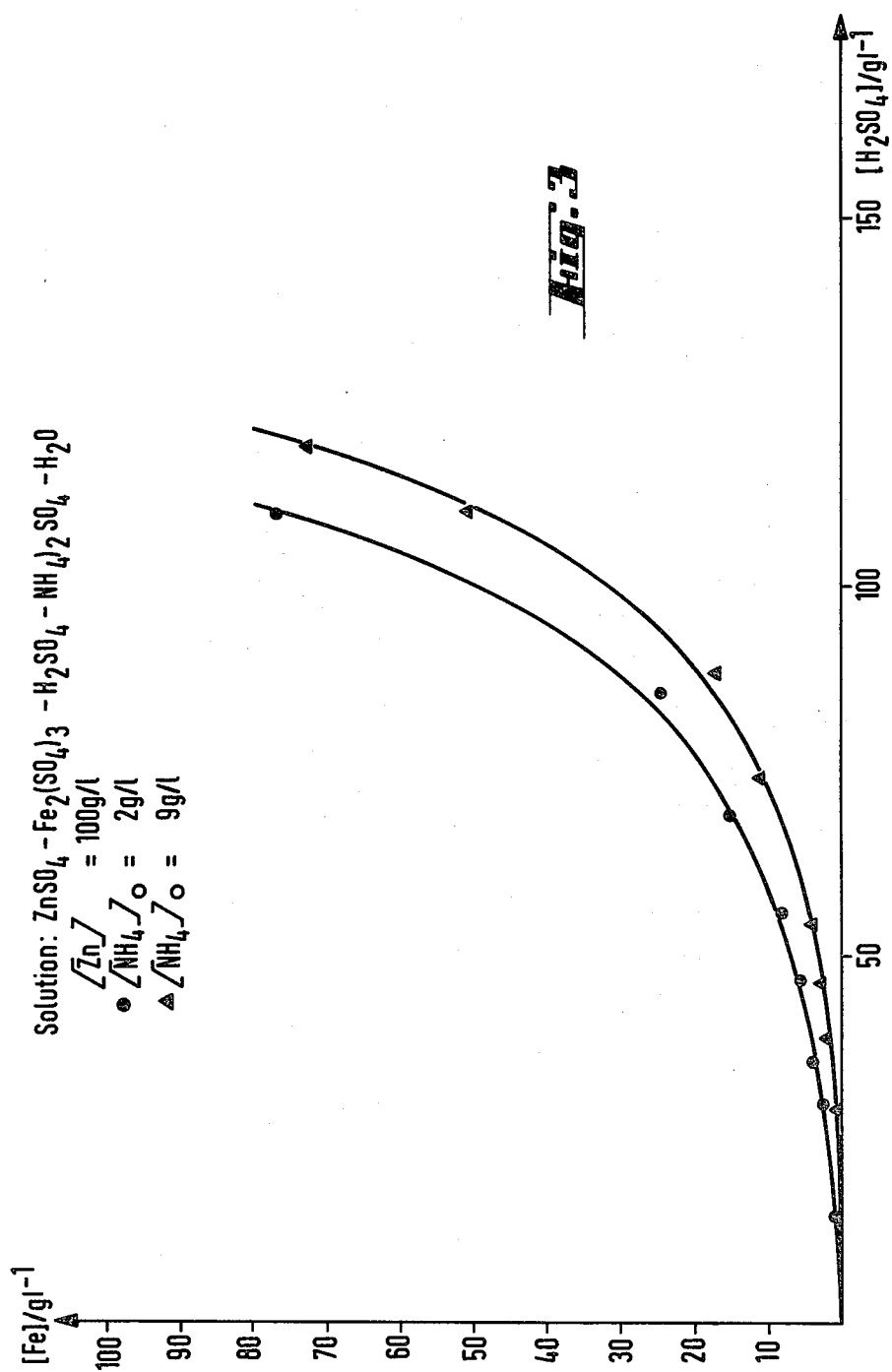

HYDROMETALLURGICAL PROCESS FOR THE RECOVERY OF LEAD, SILVER AND GOLD, AS WELL AS ZINC, FROM IMPURE JAROSITE RESIDUES OF AN ELECTROLYTIC ZINC PROCESS

BACKGROUND OF THE INVENTION

The present invention relates to a process for the recovery of zinc, lead, silver and gold from impure jarosite precipitates which contain the said metals and are derived from zinc processes, in connection with an electrolytic zinc process, especially the process disclosed in Finnish Patent Application No. 803096.

Finnish Patent Application No. 803096 discloses a process by which, in connection with an electrolytic zinc process—especially the leach process for zinc calcine in accordance with Finnish Patent Application No. 410/73—the recovery of lead, silver and gold is carried out in an economical and simple manner in addition to a high recovery of zinc, copper and cadmium.

The specification of Finnish Patent Application No. 803096 describes the current state of the art in the field of leaching processes for zinc calcine. In this context, it has also become evident that in the waste disposal areas of several zinc plants there have accumulated considerable amounts of jarosite precipitates derived from leaching processes for zinc calcine, and that these residues usually always contain some amount of zinc ferrite which has not reacted during the process, uncalcined zinc concentrate, and some or all of the lead, silver and gold contained in the concentrate feed of the plant.

The changes in the relative prices of metals in recent years—especially the sharp increase in the prices of noble metals—have lead to the current situation in which not only the zinc, copper and cadmium but also the lead, silver and gold present in the concentrates must be recovered in a competitive zinc process. This has also lead to a crucially altered situation with regard to the jarosite precipitates which were previously directed to waste disposal areas. Previously the precipitates concerned were regarded as having no or little value. Now, however, they have gained economic value owing to the zinc, lead, silver and gold contained in them; this value has been affected, on the one hand, by the changed relative prices of the metals and, on the other hand, by new alternative processes for which the jarosite precipitates of the type discussed can be considered sources of raw material from which the said metals can be recovered economically.

The object of the present invention is to provide a process by which the zinc, lead, silver and gold present in jarosite precipitate are recovered economically—in connection with the leaching process for zinc calcine disclosed in Finnish Patent Application No. 803096—from precipitates in waste disposal areas, which have been derived from a zinc process and contain zinc, lead, silver and gold.

SUMMARY OF THE INVENTION

According to the present invention the impure jarosite residue is leached in a sulfuric-acid-bearing solution in order to produce a leach residue which contains lead, silver and gold and a ferrisulfate-bearing solution and to separate them from each other, whereafter the leach residue is sulfidized and froth-flotated in order to recover a combined concentrate which contains lead, silver and gold, and the ferrisulfate-bearing solution is fed to a ferritic treatment stage, in which ferrisulfate and ferrites react in the presence of ions of alkali and ammonium at 80°–105° C. and form pure jarosite and zinc sulfate.

DESCRIPTION OF THE DRAWINGS

FIG. 3 the solubility of $NH_4$-jarosite, both as a function of the sulfuric acid concentration at 95° C.

DESCRIPTION OF THE PREFERRED EMBODIMENT

Figure 1:
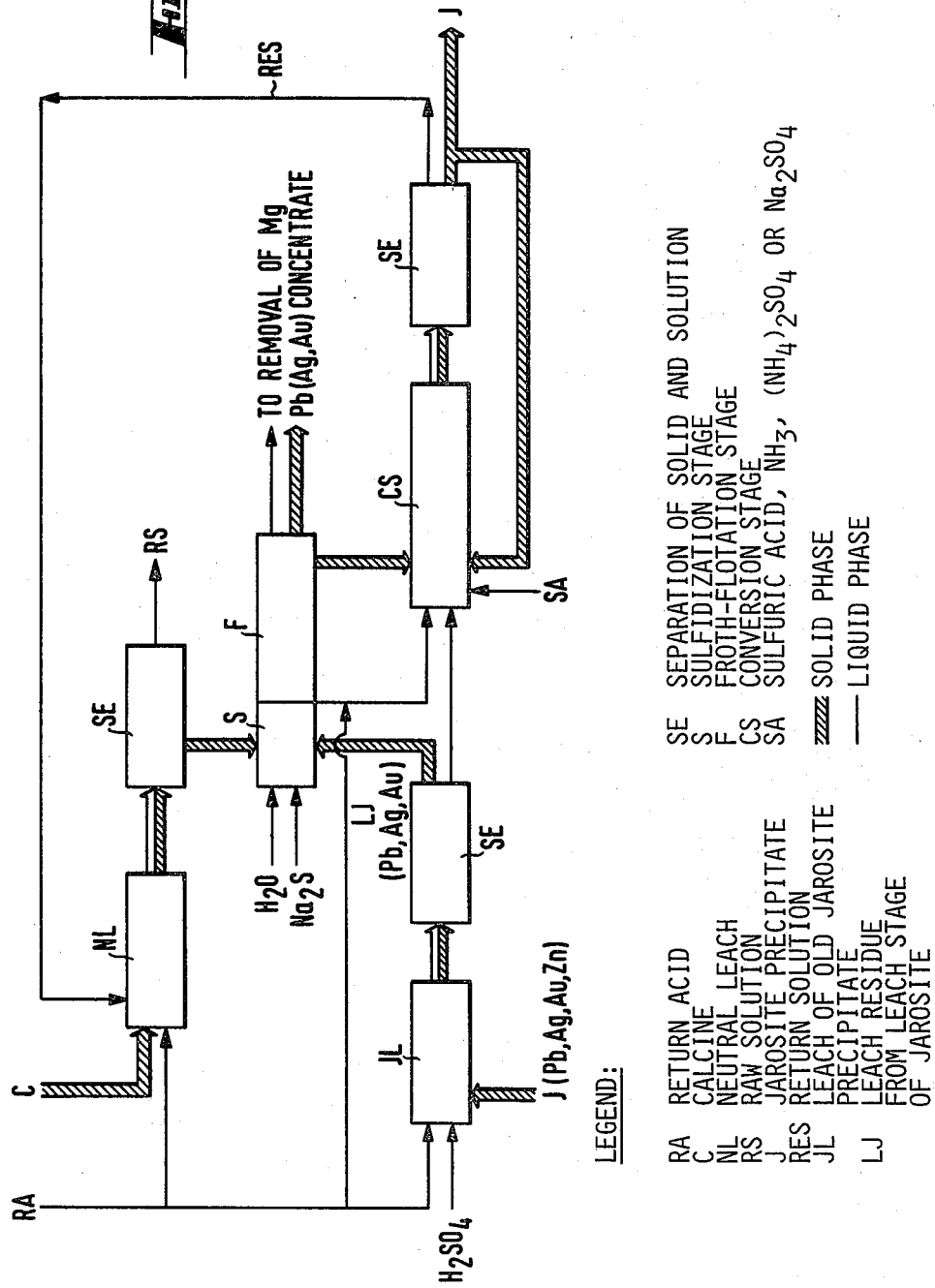
FIG. 1 depicts diagrammatically a treatment system for impure (containing zinc, lead, silver and gold) jarosite precipitate according to the present invention, linked to a leaching process for zinc calcine according to Finnish Patent Application No. 803096.

The process according to FIG. 1 is discussed. It is assumed that zinc calcine is fed into the process at 300,000 t/a—in which case the zinc production of the plant would be between 150,000 and 170,000 t/a—and that the concentration of iron in the calcine is 10%. In this case, iron at 30,000 t/a enters the leaching system. The iron emerges from the process in the form of a jarosite compound, in which case 30,000 t/a of iron corresponds to 86,500 t/a of Na-jarosite. 5100 t/a of sulfatic sulfur ($S_{SO4}$) enters the system in the calcine, if a typical average concentration, 1.7%, is taken as the concentration of $S_{SO4}$ in the calcine. Sulfatic sulfur is removed from the process at a rate of 11,400 t/a in the jarosite. If it is assumed that the calcium emerging from the process and the magnesium removed from the process take—the former in the form of gypsum and the latter in the form of magnesium sulfate—a typical amount of 1700 t/a of sulfatic sulfur out of the system, the need for sulfatic sulfur in the process is 8000 t/a. If the deficiency of sulfatic sulfur is replaced with sulfuric acid, it is necessary to feed sulfuric acid (e.g. in the form of strong sulfuric acid) into the system at 24,500 t/a.

According to the invention, impure jarosite (jarosite residue) is fed to a jarosite leaching stage (JL), into which return acid and, for example, all of the strong sulfuric acid entering the process—in the calculated example case 24,500 t/a—are also fed. If it is ensured that jarosite residue and sulfuric acid are fed in suitable proportions and that the temperature is between 60° and 95° C., the jarosite phase dissolves according to Reaction (1)

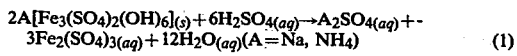
$$2A[Fe_3(SO_4)_2(OH)_6]_{(s)} + 6H_2SO_{4(aq)} \rightarrow A_2SO_{4(aq)} + 3Fe_2(SO_4)_{3(aq)} + 12H_2O_{(aq)} (A=Na, NH_4) \quad (1)$$

Figure 2:
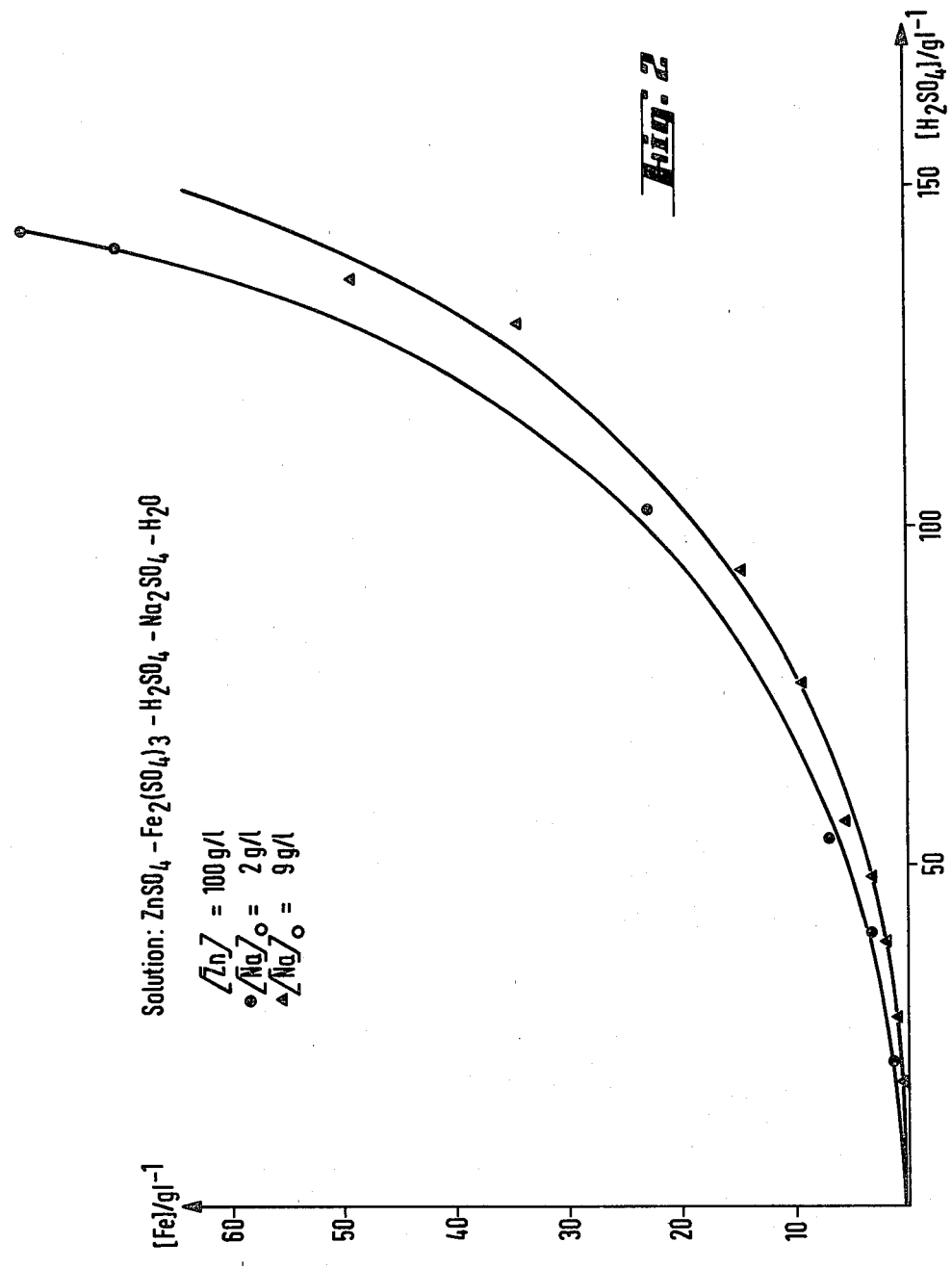
FIG. 2 depicts the solubility of Na-jarosite.

When the aim is that the concentration of iron in the solution is 30–60 g/l at the end of the reaction, the concentration of sulfuric acid in the solution must be adjusted to between 120 and 170 g/l. This is seen from FIGS. 2 and 3, which depict the solubilities of Na-jarosite and $NH_4$-jarosite as a function of the concentration of sulfuric acid in the solution at 95° C., the concentration of Na of $NH_4$ in the solution having been 2 g/l or 9 g/l at the beginning of the experiment.

The zinc ferrite contained in the jarosite residue dissolves during the JL stage according to Reaction (2)

$$ZnFE_2O_{4(s)} + 4H_2SO_{4(aq)} \rightarrow ZnSO_{4(aq)} + Fe_2(SO_4)_{3(aq)} \quad (2)$$

Ferrites, for the most part zinc ferrite (the precipitate also contains some copper ferrite and cadmium ferrite, which have not dissolved during the process), and jarosite (sodium jarosite and ammonium jarosite) are leached out from the jarosite residue during the JL stage. The main constituents of the solid phase which remains undissolved during the stage are $PbSO_4$, $CaSO_4.2H_2O$, $SiO_2$ and $Fe_2O_3$. The solid phase also contains the silver (as chloride and sulfide) and gold of the jarosite residue. The solid phase and the solution are separated after the JL stage. The solid phase is washed and directed to a sulfidization stage (S). During this stage, the lead and silver both of the ferritic leach residue from the main line and of the residual solid phase [leach residue (LR)] from the JL stage are brought completely to a sulfide form. From the sulfidization stage the slurry is directed to froth-flotation, the products of which are a frothed concentrate [a Pb(Ag, Au) concentrate] and a ferritic froth-flotation residue which contains the ferrites of the calcine feed. The solution is directed to a magnesium removal stage, during which the zinc is precipitated out from the solution and returned to the system. The froth-flotation residue, which is directed to the conversion stage (CS) of the process, contains, in addition to ferrites, also gypsum, silica and also some hematite. Also fed to the conversion stage is the solution from the separation stage which is subsequent to the jarosite leach (JL). This solution contains, in the form of ferrisulfate, the iron of the jarosite residue.

The sulfuric acid amount required by Reaction (2) during the JL stage and the basic level of the concentration of sulfuric acid in the solution (120–170 g/l) are obtained from the return acid fed to the stage. The sulfuric acid amount required by Reaction (1), for its part, is obtained for a major part from the excess sulfuric acid fed into the process and for a minor part from the return acid entering this stage. During the JL stage it is necessary to maintain the sulfuric acid level of the solution at 120–170 g/l in order for the jarosite to dissolve to a sufficient degree, and the concentration of sulfuric acid in the return acid—160–200 g/l—does not greatly exceed this level.

In the example case described above, in which iron enters the process at 30,000 t/a in the calcine, a suitable amount of iron to be fed into the process in jarosite residue is 15,000 t/a. This corresponds to about 50,000 t/a of jarosite residue. According to Formula (1), the sulfuric acid amount corresponding to the iron of the jarosite, 15,000 t/a, is about 26,000 t/a.

To the conversion stage of the process there are fed the entire ferrite content of the calcine feed, in the example case corresponding to an iron content of 30,000 t/a, the $H_2SO_4$-$Fe_2(SO_4)_3$-$ZnSO_4$ solution coming via the JL line, the iron content of the solution being 15,000 t/l, and a suitable amount of return acid.

During the conversion stage in the example case, one-half of the zinc ferrite reacts with the $Fe_2(SO_4)_3$ coming via the JL line, in accordance with Reaction (3)

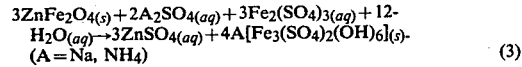
(A=Na, NH$_4$)     (3)

and one-half of it reacts in accordance with Reaction (4)

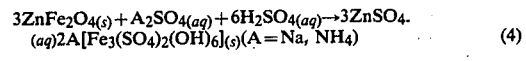
    (4)

When reactions (1), (3) and (4) are added together, the sum reaction obtained is

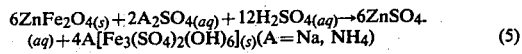
    (5)

i.e. the same sum reaction which in a normal case—without the JL line—occurs during the conversion stage.

An examination of the occurrences during the JL and CS stages shows that the jarosite phase of the impure jarosite entering the JL stage is leached with the same sulfuric acid amount as in a system without the JL line would be fed directly to the conversion stage. In the process according to FIG. 1, the excess sulfuric acid and part of the return acid thus circulates via the JL stage—before it is directed to the conversion stage—and during the JL stage it dissolves the jarosite phase of the impure jarosite and leaves a solid phase which contains the lead, silver and gold of the impure jarosite (jarosite residue); these elements are now carried in the solid phase to the sulfidization and froth-flotation stages of the main line, in which the lead, silver and gold are recovered in the form of a frothed concentrate.

The solution arriving at the conversion stage from the JL line does not change the flow of solution passing through this stage, i.e. the flow which would pass through this stage without the leaching stage for jarosite residue. The solution coming from the JL stage to the conversion stage is in this case not a pure return acid solution, but part of its sulfuric acid has been replaced, in Reaction (1), by an equivalent amount of ferrisulfate. During the conversion stage this ferrisulfate performs the same task—it yields the sulfate to the zinc of zinc ferrite in Reaction (3)—as does the sulfuric acid of the return acid in Reaction (4) when reacting with zinc ferrite and $A_2SO_4$ (A=Na, NH$_4$). In both cases, the iron participating in the reactions passes into a jarosite form.

Using the process according to the invention, it is thus possible to recover the zinc, lead, silver and gold of jarosite residue by linking to the leaching system for zinc calcine according to Finnish Patent Application No. 803096 only the equipment required by the jarosite leach (JL) and the separation stage connected with it. The jarosite phase of the impure jarosite passes into the solution during the JL stage, leaving in the solid phase the lead, silver and gold of the jarosite residue, and it is re-formed as pure jarosite during the conversion stage of the process. The iron from the main line and the JL line is removed from the process in the form of pure jarosite.

If it is assumed that the jarosite residue has been produced previously by the process according to Finnish Patent Application No. 410/73, and a calcine of a similar type is used in it and in the process according to Finnish Patent Application No. 803096, it is possible, by adopting the processing of jarosite residue according to the invention, at the same time to increase the amount of frothed concentrate [Pb(Ag, Au) concentrate] by 50% using the same basic equipment, this increase being now derived from the lead, silver and gold contained in the jarosite residue.

The invention is described below in greater detail with the aid of examples.

EXAMPLE 1

2000 g of jarosite residue (Fe 30%, NH$_4$ 2.3%, Pb 2.5%, Zn 2.0%, Ag 130 g/t, Au 0.7 g/t) was taken and slurried in 12 liters of a solution prepared from sulfuric acid and return acid (Zn 50 g/l, $NH_4$ 4 g/l, $H_2SO_4$ 240 g/l and Cl 80 mg/l). The temperature of the slurry was raised to 95° C. and kept at that level for 2 h. The jarosite phase of the jarosite residue dissolved according to Reaction (4). After this treatment, the solid phase and the solution phase were separated. The washed and dried solid phase amounted to 310 g (Fe 16.4%, Pb 16.0%, Zn 3.3%, Ag 760 g/t, Au 5.4 g/t). The composition of the solution phase was Fe 48.9 g/l, Zn 51.9 g/l, $NH_4$ 9.5 g/l, and $H_2SO_4$ 152 g/l. The solution phase was directed to the conversion stage, and the solid phase was directed to the sulfidization and froth-flotation stages.

The sulfidization treatment was carried out in a closed reactor provided with mixing, a thermometer, a water manometer, a pH electrode, and equipment for feeding sulfide.

150 g of jarosite-leach residue was slurried in 1000 ml of a $H_2SO_4$ solution which contained $H_2SO_4$ 5 g/l. 20 g of PbS and 100 mg of $Ag_2S$ were added to the slurry. The moisture content of the added sulfides was 40-50% $H_2O$. The temperature of the slurry was raised to 50° C., whereafter 50 ml of a 2.5 M solution of $Na_2S$ was fed into it at an even rate during the course of three hours. The pH of the slurry was 1.5 at the beginning and 2.5 after the addition of the sulfide solution.

The jarosite-leach residue contained lead 16%, silver 760 g/t, gold 5.4 g/t, zinc 3.3%, iron 16.4%, sulfur 11.7%, and calcium 6.2%. After the addition of silver and lead sulfide, the concentration of silver in the solid was 1050 g/t and the concentration of lead 21.8%. A froth-flotation was carried out on the thus treated material as follows.

The concentration of solid material in the slurry was diluted to 30% by adding water. The slurry was placed in a froth-flotation cell, the pH was adjusted to 2 by adding $H_2SO_4$. 250 g/t of a sulfide collector of the thiophosphate type (Aerofloat 242 Promoter, manufacturer American Cyanamid) was added to the slurry. This was followed by preparation lasting about 1 min at the said pH, whereafter a pre-concentrate was froth-flotated (the froth-flotation lasted about 15 min). 400 g/t of the said collector was added to the residual slurry, and after preparation lasting about 1 min, a residual concentrate was froth-flotated. The pre-concentrate and the residual concentrate were combined (after an analysis sample had been taken), and froth-flotation was repeated on this product three times. The result obtained is shown in the following table.

|  | Product of sulfidization = feed | Pb—Ag sulfide concentrate $KR_3$ | Froth-flotation residue |
| --- | --- | --- | --- |
| % by weight | 100.0 | 33.3 | 66.7 |
| Ag g/t | 1050 | 2990 | 82 |
| Ag yield % | 100.0 | 94.8 | 5.2 |
| Au % | 5.4 | 14.4 | 0.9 |
| Au yield % | 100.0 | 88.5 | 11.5 |
| Pb % | 21.8 | 61.5 | 2.0 |
| Pb yield % | 100.0 | 93.9 | 6.1 |
| Zn % | 3.3 | 4.4 | 2.8 |
| Zn yield % | 100.0 | 44.4 | 55.6 |
| Fe % | 16.4 | 2.2 | 23.5 |
| Fe yield % | 100.0 | 4.5 | 95.5 |

Distribution of valuable elements in the froth-flotation of Example 1

As is evident from the text and the above example, the process according to the present invention is a very simple and effective method of recovering lead, silver and gold from raw materials of the said type, which contain the said valuable elements. In the case of the example, sulfidization and froth-flotation have yielded a product in which the concentrations of silver, lead and gold have been tripled, the average yield being over 90%.

EXAMPLE 2

150 g of jarosite-leach residue was mixed with 1350 g of ferritic leach residue (Finnish Patent Application No. 803096). This solid mixture was slurried in 5000 ml of a $H_2SO_4$ solution which contained $H_2SO_4$ 5 g/l. 55 g of PbS and 300 mg of $Ag_2S$ were added to the slurry. The moisture content of the added sulfides was 40-50% $H_2O$. The sulfidization treatment of the slurry was carried out using equipment according to the previous example, the temperature being maintained at 50° C. 200 ml of a 2.5 M $Na_2S$ solution was added at an even rate during the course of three hours. The pH of the slurry was 1.5 at the beginning but rose to 5.1 during the experiment. The solid phase which was the final product of the sulfidization contained lead 7.9%, 4.8 percentage points of it being derived from the ferritic leach residue, 1.5 percentage points from the jarosite-leach residue, and 1.6 percentage points from the PbS mixed in to serve as nuclei. The mixture contained silver 380 g/t, out of which the proportion of ferritic leach residue was 230 g/t, that of jarosite-leach residue 70 g/t, and that of $Ag_2S$ mixed in to serve as nuclei 80 g/t. The mixture contained iron 37.4% and zinc 19.7%.

A froth-flotation experiment was carried out on the thus obtained material in the manner of the previous example. The number of repeated froth-flotations was 5, and the following result was obtained.

|  | Product of sulfidization = feed | Pb—Ag sulfide concentrate $KR_5$ | Froth-flotation residue |
| --- | --- | --- | --- |
| % by weight | 100.0 | 11.4 | 88.6 |
| Ag g/t | 380 | 3150 | 24 |
| Ag yield % | 100.0 | 94.5 | 5.5 |
| Pb % | 7.9 | 62.2 | 0.9 |
| Pb yield % | 100.0 | 89.8 | 10.2 |
| Zn % | 19.7 | 8.2 | 21.2 |
| Zn yield % | 100.0 | 4.7 | 95.3 |
| Fe % | 37.4 | 6.3 | 41.4 |
| Fe yield % | 100.0 | 1.9 | 98.1 |

Distribution of valuable elements in the froth-flotation of Example 2.

What is claimed is:

1. A hydrometallurgical process for the recovery of lead, silver, gold and zinc from the impure jarosite residue of an electrolytic zinc process, comprising: leaching the jarosite residue in a sulfuric-acid-bearing solution in order to produce a leach residue which contains lead, silver and gold and a ferrisulfate-bearing solution and to separate them from each other; then sulfidizing and froth-flotating the leach residue in order to recover a combined concentrate which contains lead, silver and gold; and feeding the ferrisulfate-bearing solution to a ferritic treatment stage, in which ferrisulfate and ferrites react in the presence of ions of alkali and ammonium at 80°-105° C. to form pure jarosite and zinc sulfate.

2. A process according to claim 1, in which the impure jarosite residue is leached in a sulfuric-acid-bearing solution which is so strong that its final concentration is approximately 120-170 g $H_2SO_4$/l and 30-60 g Fe/l.

3. A process according to claim 1, in which the impure jarosite residue is leached in a sulfuric-acid-bearing solution the temperature of which is approximately 60°–95° C.

4. A process of claim 1, in which the leach residue is sulfidized and froth-flotated together with ferrite derived from the neutral leach of zinc calcine, the ferrite being thereafter fed to the said ferritic treatment stage.

5. A process according to claim 4, in which the sulfidization is carried out in a closed chamber by feeding into the slurry formed by the leach residue and ferrite a sulfide amount which is equivalent with regard to the amount of lead, silver and gold.

6. A process according to claim 4, in which the sulfidization is carried out in the presence of finely-divided lead sulfide and silver sulfide nuclei and preferably by returning part of the sulfide concentrate recovered by froth-flotation to sulfidization in order to serve as the said nuclei.

7. A process according to claim 4, in which the sulfidization is carried out at an elevated temperature of at maximum 80° C., at a pH of 3–6, and within 2–6 hours.

8. A process according to claim 4, in which the sulfidized slurry is froth-flotated at a pH of 2–4 in the presence of a sulfide collector and a dispersing agent, as well as a frothing agent.

9. A process according to claim 8, in which the froth-flotation is carried out at a pH of 2–3 in the presence of thiophosphate or a phosphine derivative.

10. A process according to claim 8, in which the froth-flotation is carried out at a pH of 3–4 in the presence of xanthate.

* * * * *